Figure 5:
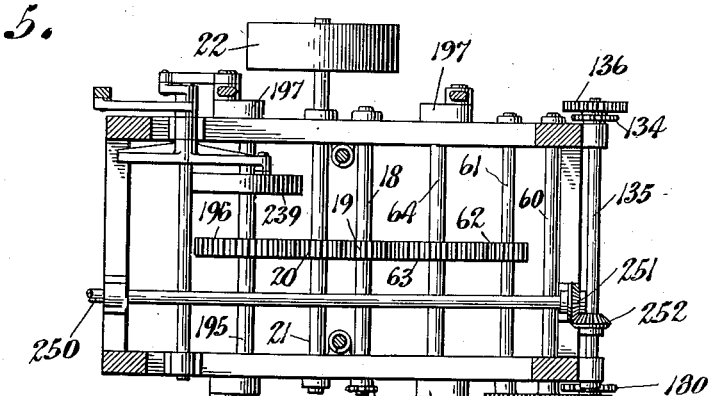

M. VIERENGEL.
MACHINE FOR MAKING WINDOW ENVELOPS.
APPLICATION FILED DEC. 12, 1911.
1,201,777.
Patented Oct. 17, 1916.
11 SHEETS—SHEET 1.
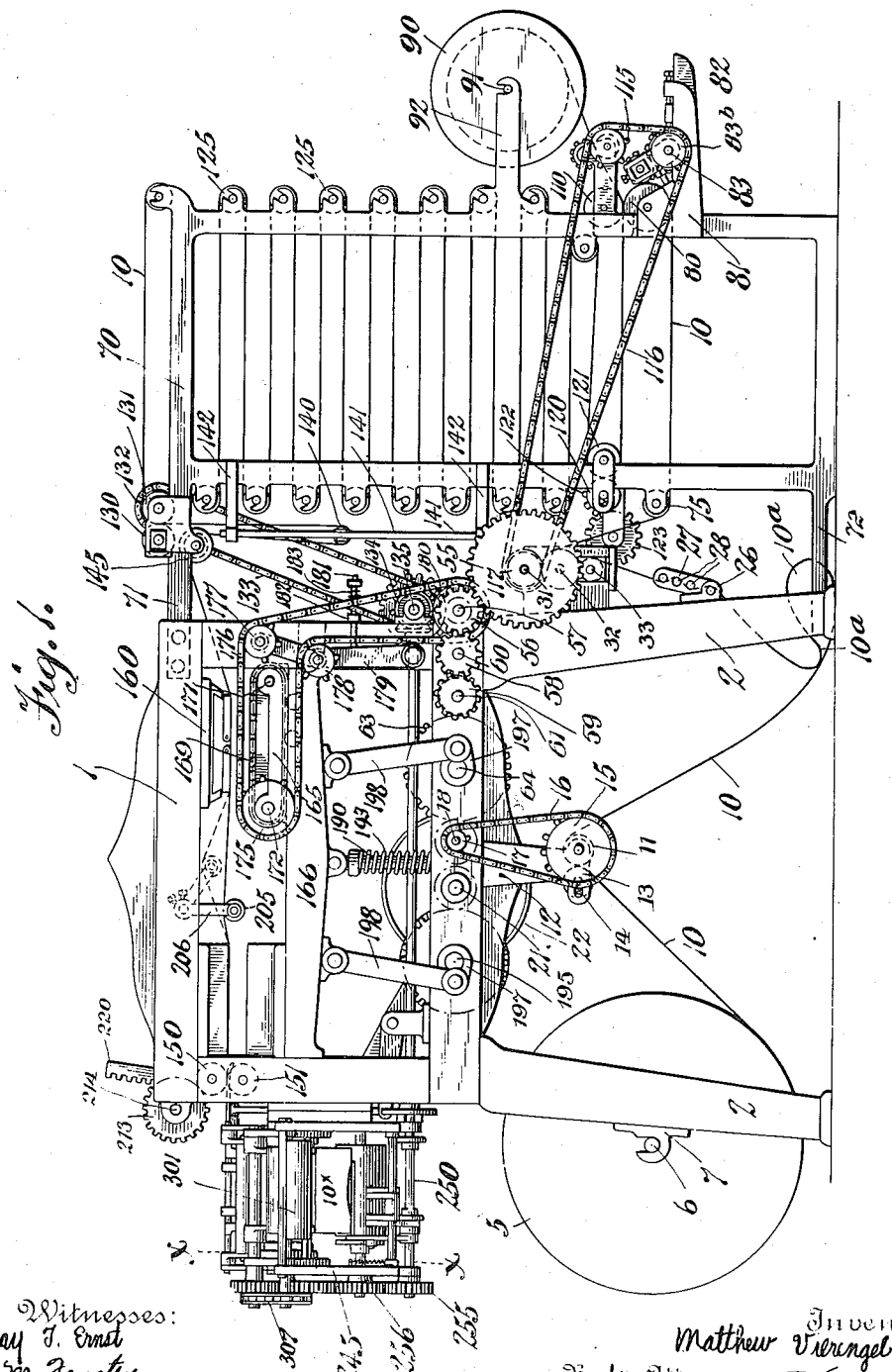

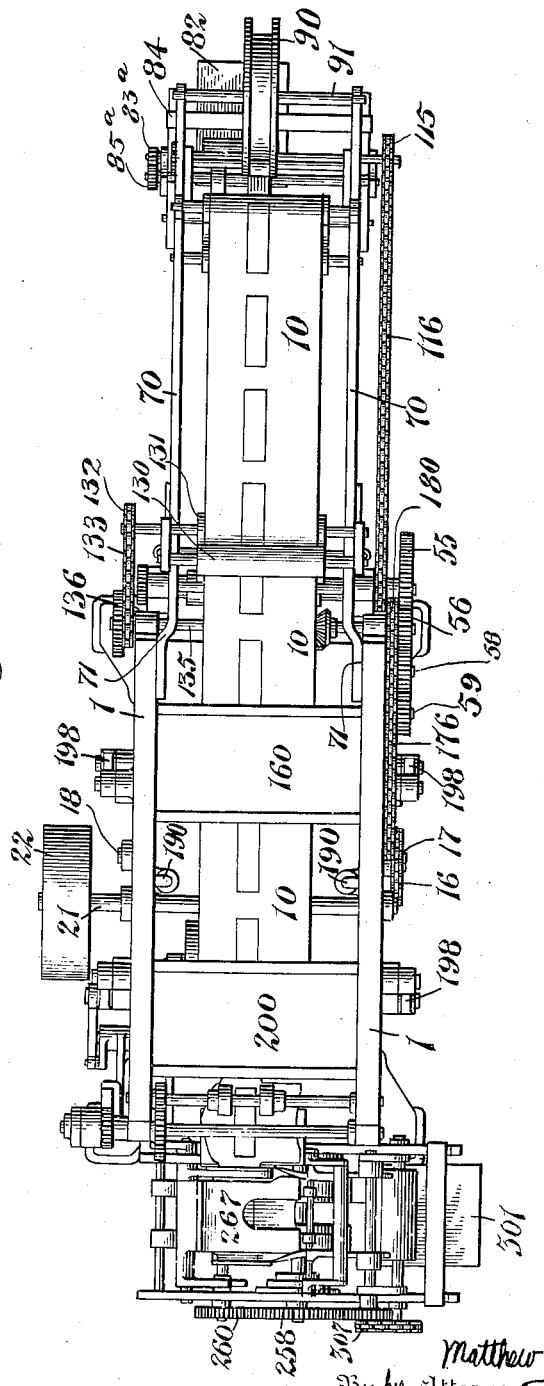

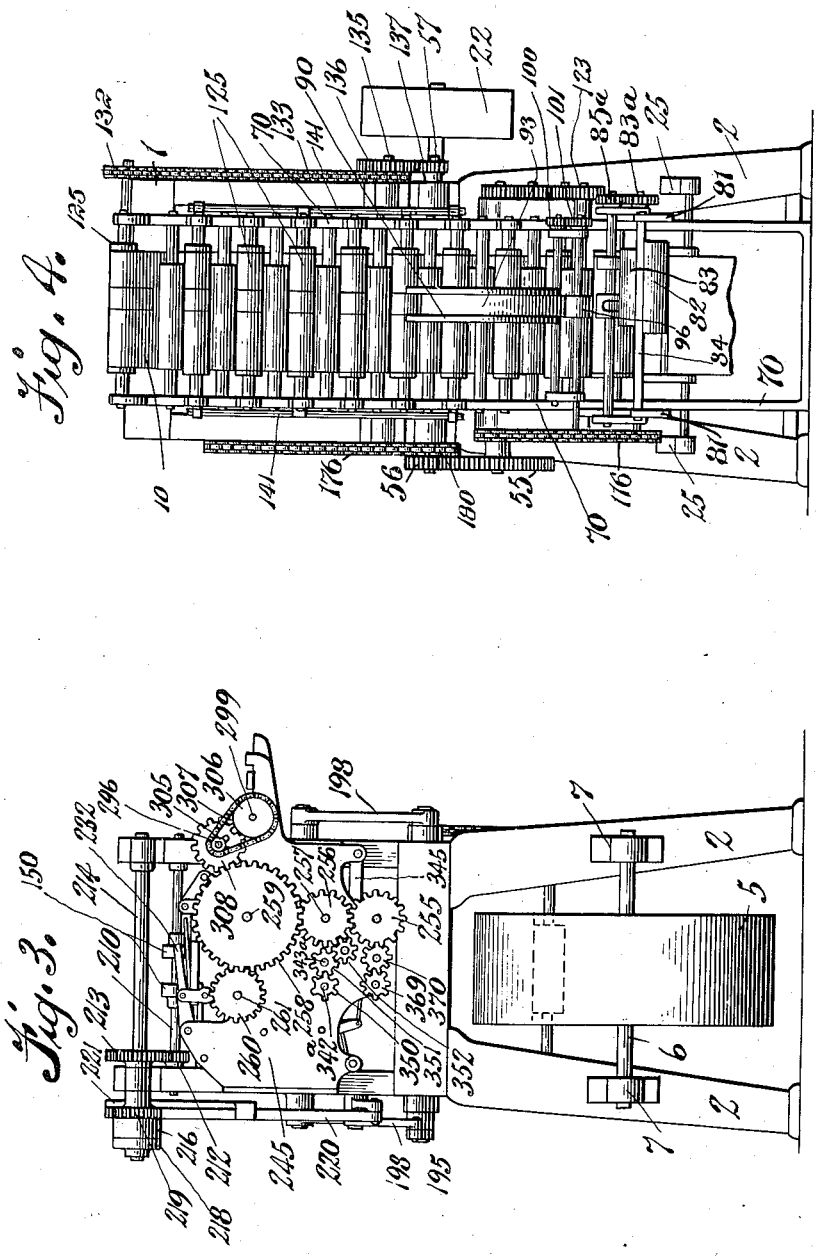

M. VIERENGEL.
MACHINE FOR MAKING WINDOW ENVELOPS.
APPLICATION FILED DEC. 12, 1911.

1,201,777.

Patented Oct. 17, 1916.
11 SHEETS—SHEET 4.

Witnesses:
Ray J. Ernst
E. M. Fenster

Inventor
Matthew Vierengel
By his Attorney

M. VIERENGEL.
MACHINE FOR MAKING WINDOW ENVELOPS.
APPLICATION FILED DEC. 12, 1911.

1,201,777.

Patented Oct. 17, 1916.
11 SHEETS—SHEET 5.

Witnesses:
Ray J. Ernst.
E. M. Fenster

Inventor
Matthew Vierengel
By his Attorneys

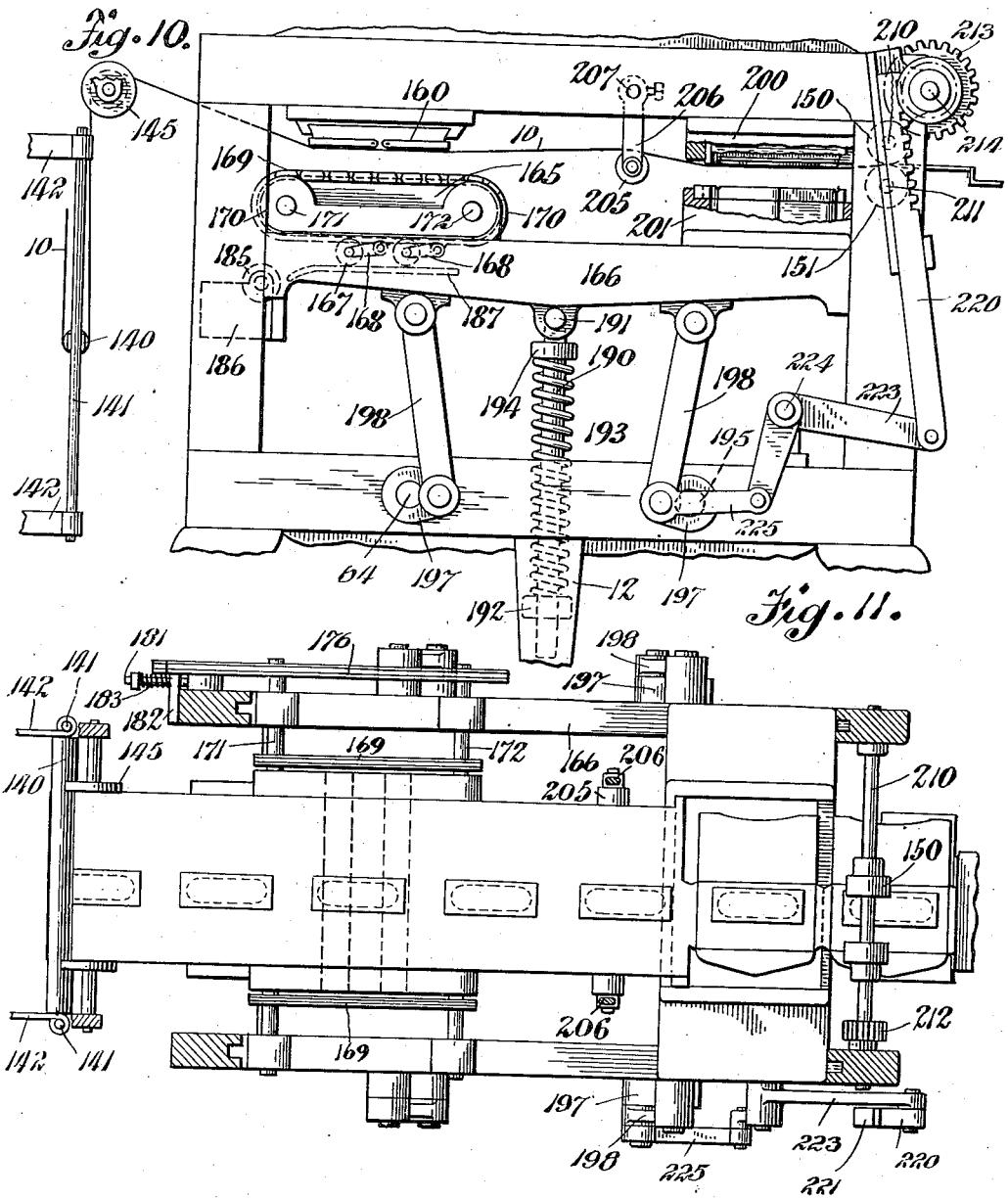

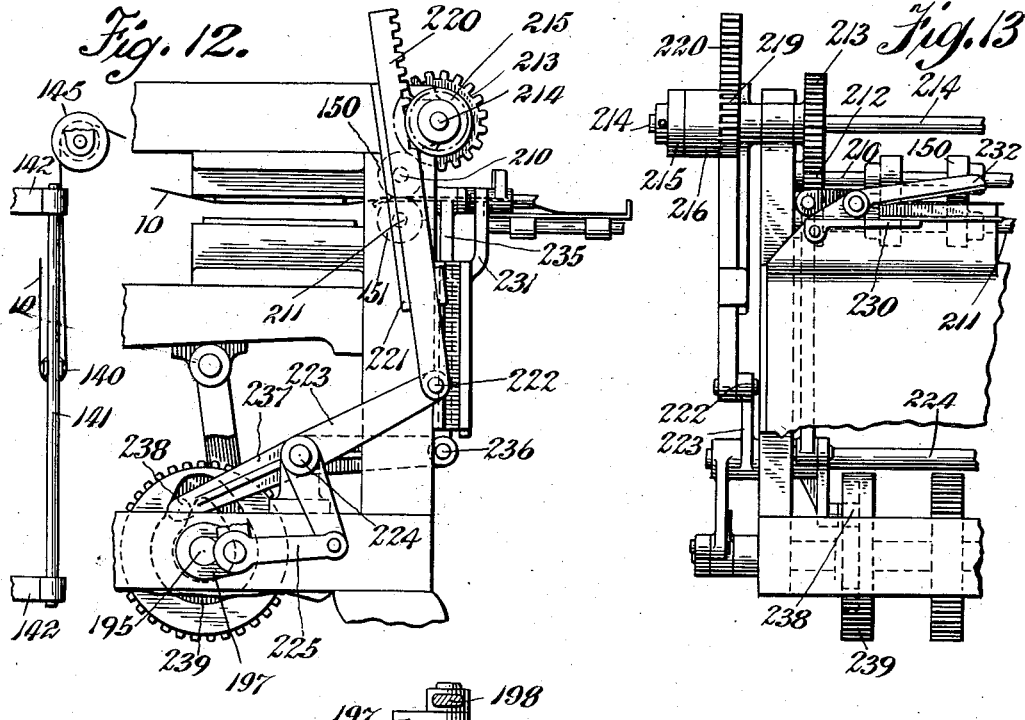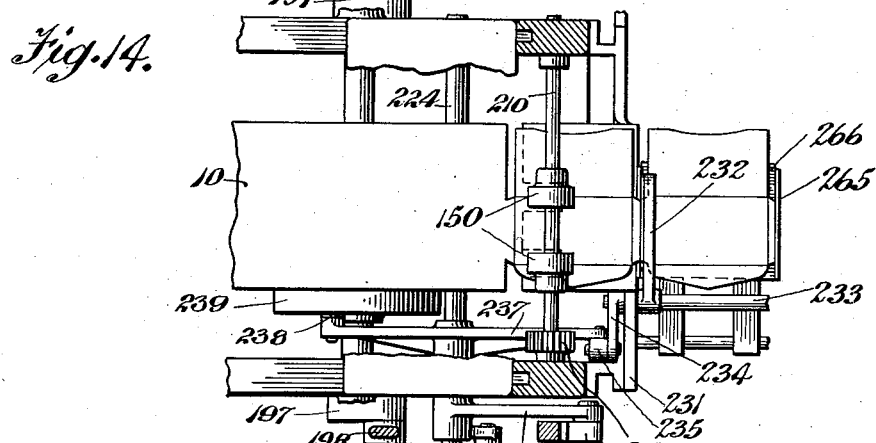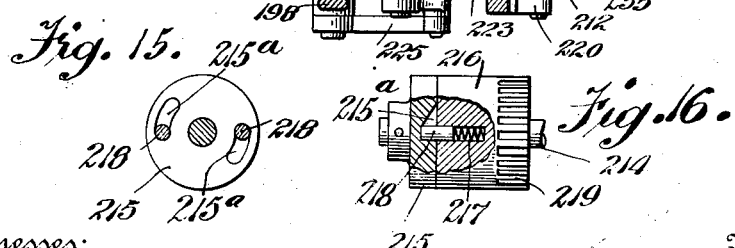

M. VIERENGEL.
MACHINE FOR MAKING WINDOW ENVELOPS.
APPLICATION FILED DEC. 12, 1911.
1,201,777.
Patented Oct. 17, 1916.
11 SHEETS—SHEET 8.
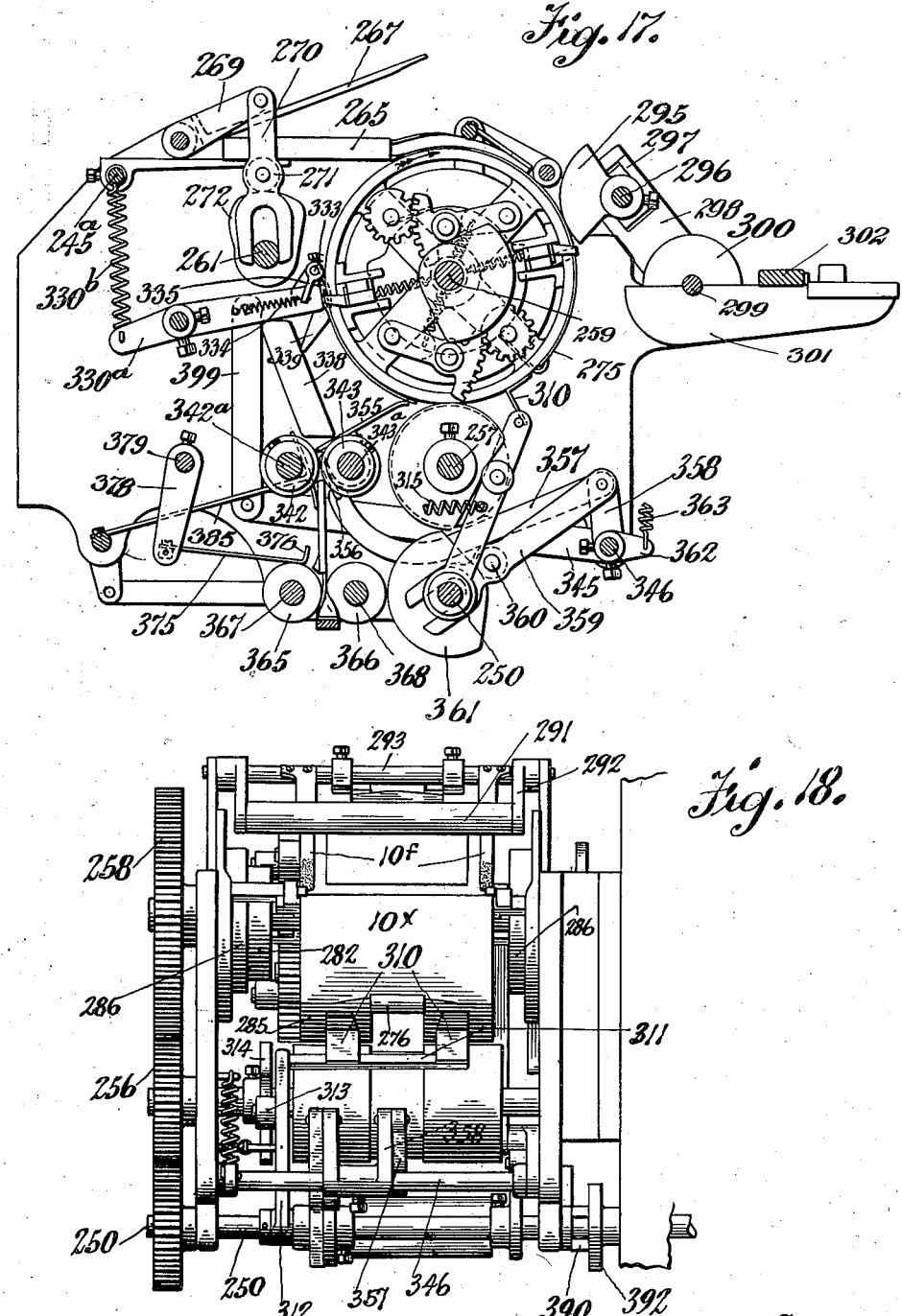

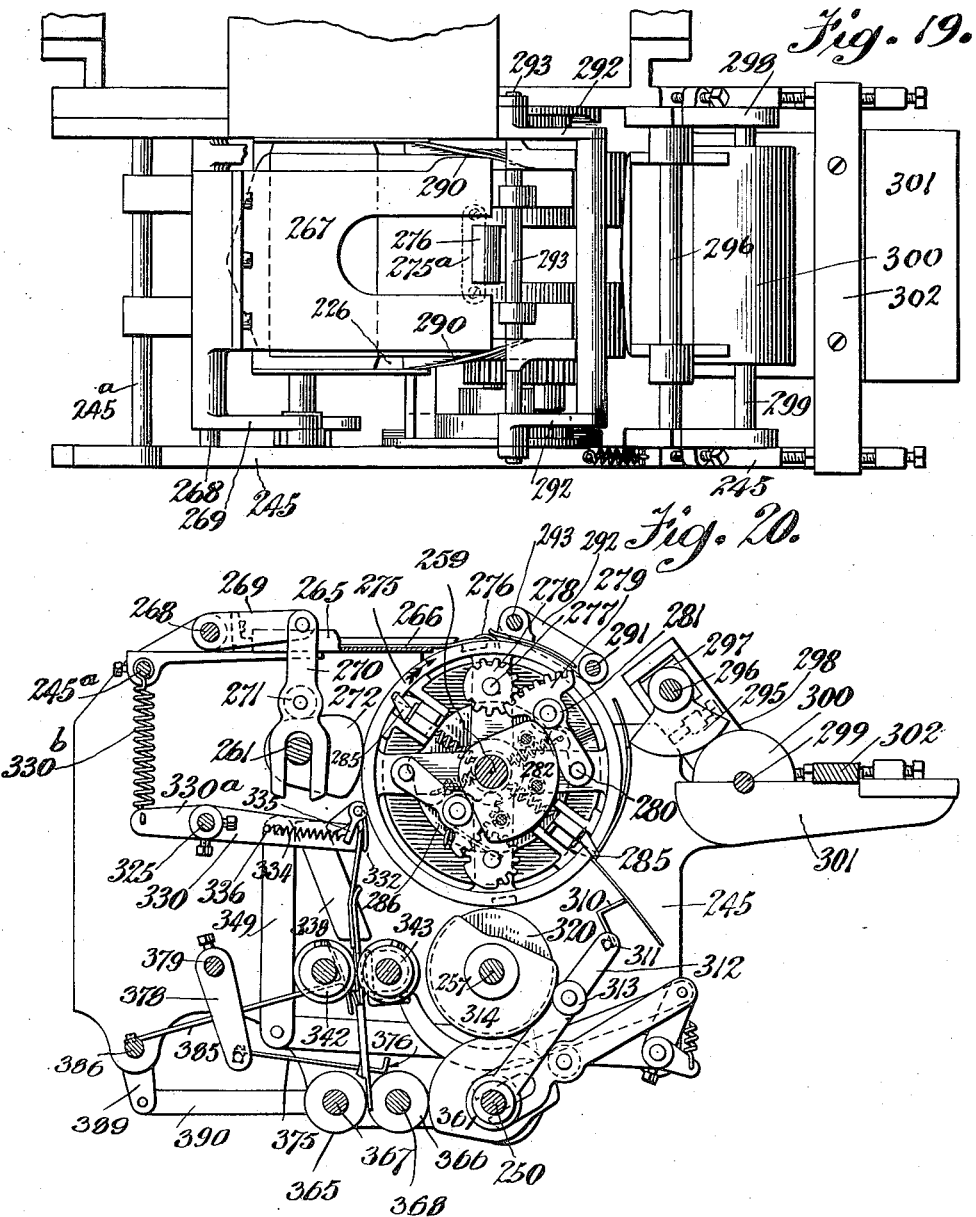

M. VIERENGEL.
MACHINE FOR MAKING WINDOW ENVELOPS.
APPLICATION FILED DEC. 12, 1911.

1,201,777.

Patented Oct. 17, 1916.
11 SHEETS—SHEET 10.

Witnesses:
Ray J. Ernst
E. M. Fenster

Inventor
Matthew Vierengel
By his Attorneys

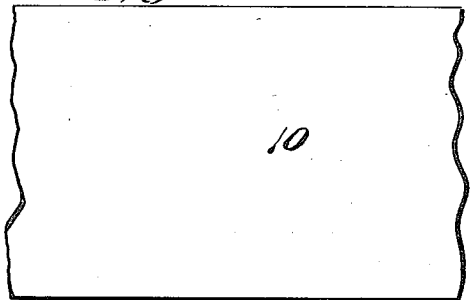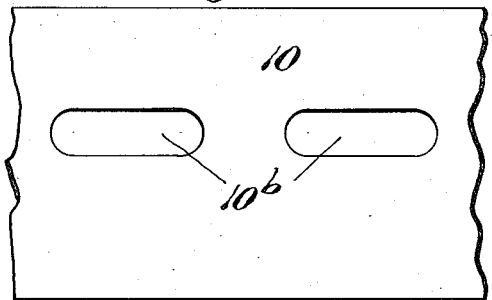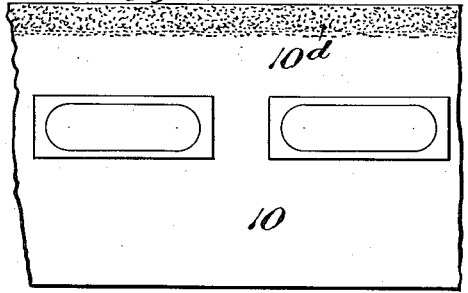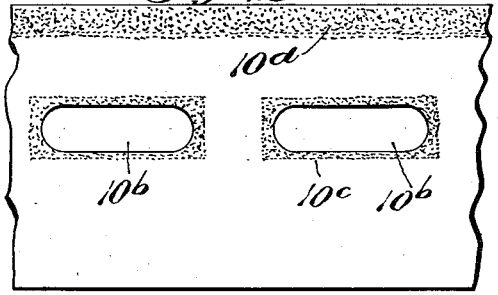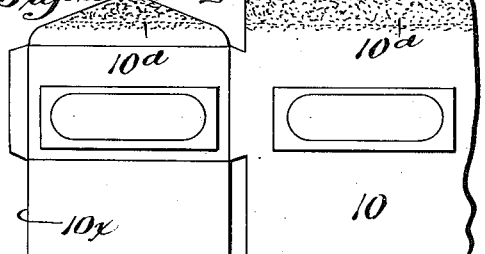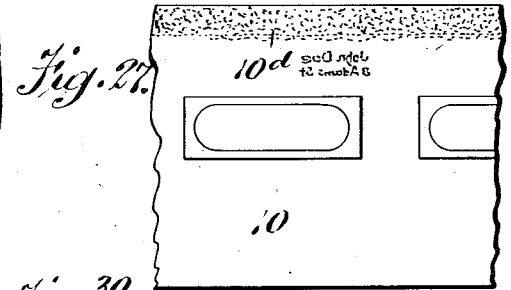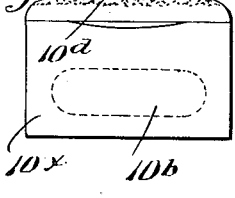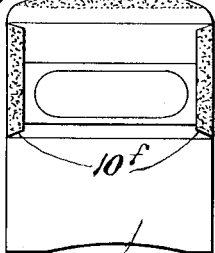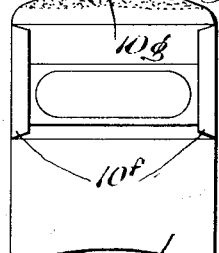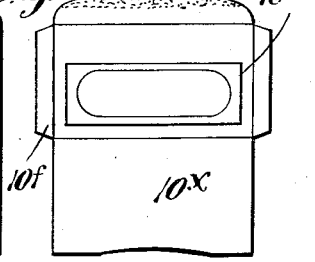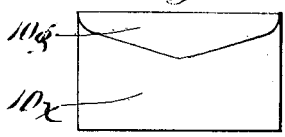

UNITED STATES PATENT OFFICE.

MATTHEW VIERENGEL, OF BROOKLYN, NEW YORK, ASSIGNOR TO SAMUEL CUPPLES ENVELOPE COMPANY, OF ST. LOUIS, MISSOURI, A CORPORATION OF MISSOURI.

MACHINE FOR MAKING WINDOW-ENVELOPS.

1,201,777.  Specification of Letters Patent.  Patented Oct. 17, 1916.

Application filed December 12, 1911. Serial No. 665,351.

*To all whom it may concern:*

Be it known that I, MATTHEW VIERENGEL, a citizen of the United States, and resident of the borough of Brooklyn, in the county of Kings and State of New York, have invented certain new and useful Improvements in Machines for Making Window-Envelops, of which the following is a full and clear specification.

The object of the present invention is to produce a machine for continuously manufacturing window envelops from a continuous web or roll of paper.

To this end the invention comprises means for feeding a web of paper, means for cutting a succession of spaced window openings in said web, means for applying transparent patches over said window openings, means for cutting out successive blanks from said patched web, and means for forming the blanks into envelops.

At one stage in the operation of manufacturing envelops, a supply of gum or paste is applied to the parts of the web which constitute the sealing flaps of the completed envelops. This gum or paste for the sealing flaps is preferably applied to the moving web at the same time that the paste is applied around the window openings for sealing the patches thereto. The moving web with attached window patches and gum or paste for the sealing flaps, is preferably run through a drying stack to properly dry the patches upon the web and the gum or paste of the sealing flaps.

The invention also includes a printing mechanism for printing the envelop blanks prior to their formation into envelops. In the preferred embodiment of the machine, the printing mechanism and blank cutting mechanism are mounted upon a common reciprocatory bed to effect the simultaneous printing of one blank and the cutting or blanking out of the preceding blank. The window openings are cut from the web and the patches and sealing flap paste are applied to the web while the web is moving at uniform speed; but the printing and blanking out operation are performed while the web is stationary, so that the feed of the web past the mechanisms for accomplishing these first named results is continuous, while the feed of the web past the printing and blanking out mechanisms is intermittent. Between the continuous and intermittent web feeding devices, I provide a web take-up device which takes up the surplus of web from the continuous feeding devices while the intermittent feeding devices are at rest, and pays off a sufficient extent of the web to the intermittent feeding devices when they act to place a new section of the web in position for the operation of the printing and blanking out mechanisms.

The blanking out mechanism cuts the successive sections of the patched and printed web with proper relation to the patched windows, giving the proper shape to the blanks which are to be formed into envelops, and impresses flap creasing lines upon the blanks. The blanks are not severed from the web by the blanking out mechanism but are carried by the movement of the web into position against the gages of the final envelop forming mechanism and severed from the web in said gaged position by a suitable intermittently operating knife. The successive creased blanks are taken by grippers upon a rotary envelop forming cylinder and carried through suitable folding guides which fold the side flaps of the blank inwardly in position to pass under pasting rolls which apply the paste or gum to the infolded side flaps. A second set of side grippers upon the cylinder then engages the folded edges of the blank, while the first set of grippers releases the leading edge of the blank in time to be engaged by suitable fingers which pass the leading flap of the envelop over into engagement with the pasted side flaps. The pasted seams are then pressed down by passing suitable seam pressure rollers. The formed envelop is then delivered from the cylinder through suitable delivery grippers which carry the envelop through suitable guides and deposit it in the bight of suitable rollers which, coöperating with suitable controlling fingers, bend over the seam flap which is pressed into place as the envelop is delivered from the machine.

In order that my invention may be fully understood I will first describe the same with reference to the accompanying drawings and afterward point out the novelty more particularly in the annexed claims.

Figure 6:
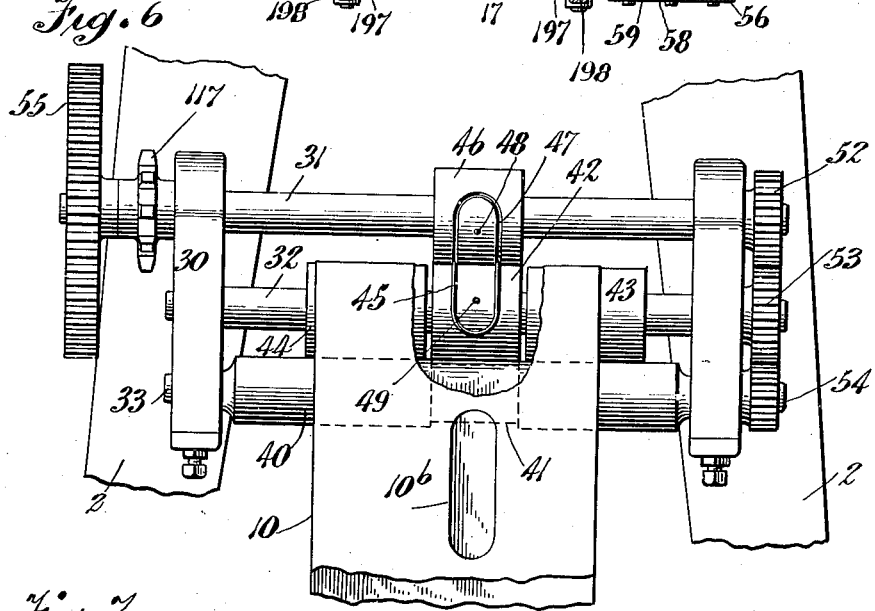
Figure 7:
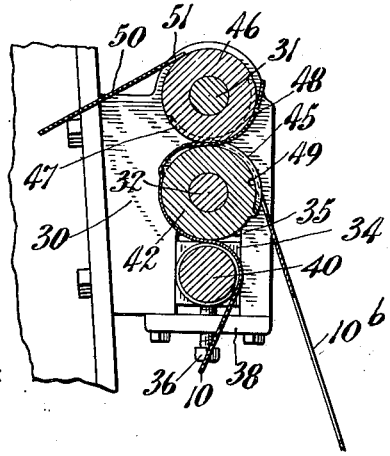
Figure 8:
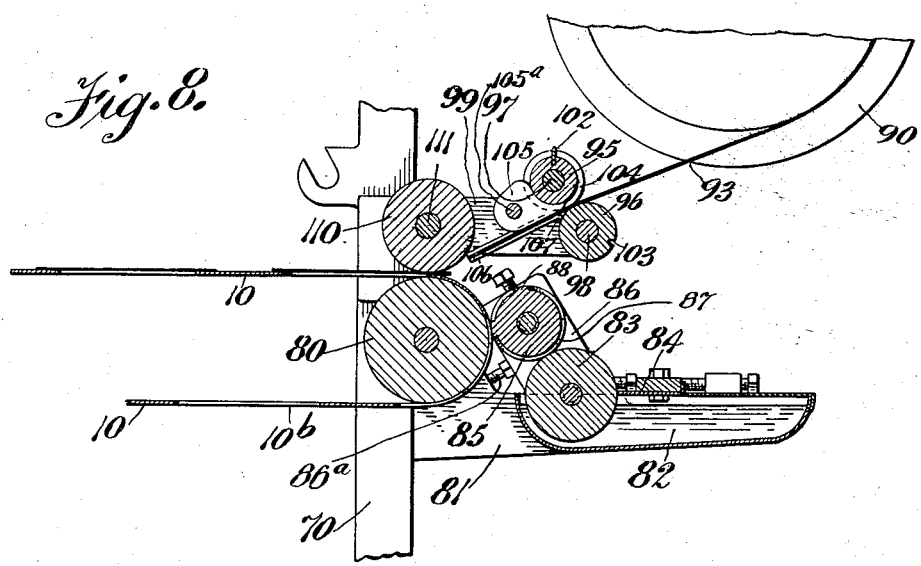
Figure 9:
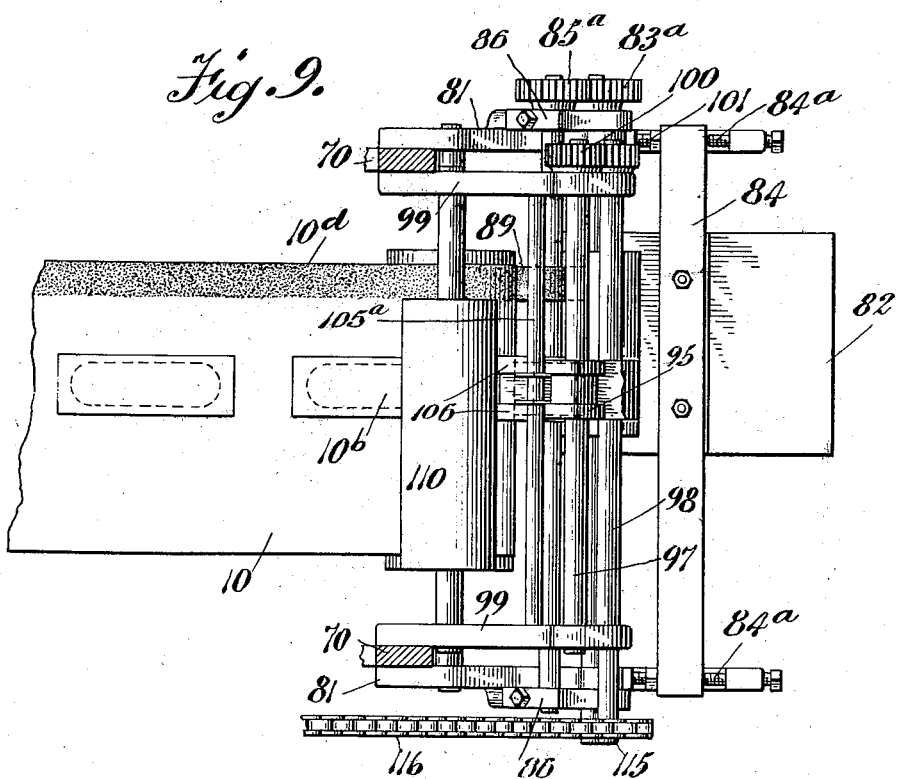
Figure 21:
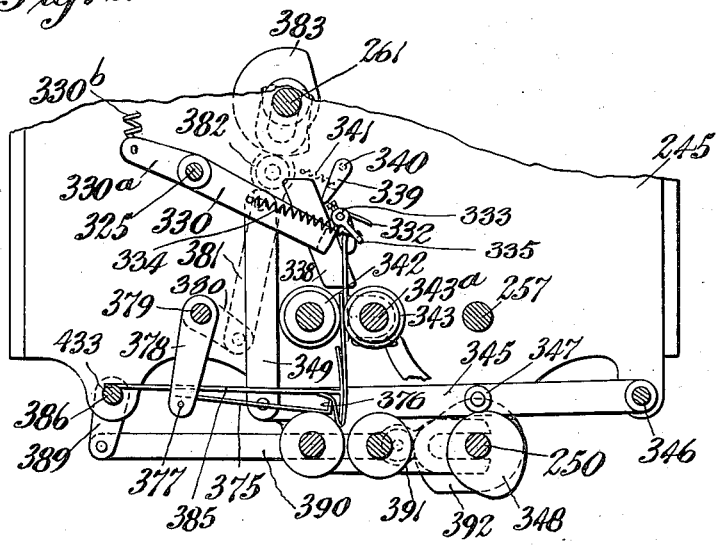
Figure 22:
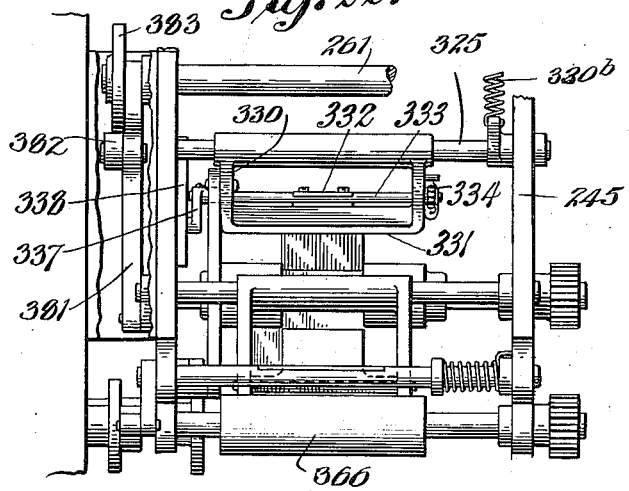

In said drawings Figure 1 is a side elevation of my improved window envelop machine. Fig. 2 is a plan view of the same. Fig. 3 is an end elevation of the same looking at the left hand end of the machine as illustrated in Fig. 1. Fig. 4 is an end elevation of the machine looking at the right hand end of the machine as shown in Fig. 1. Fig. 5 is a horizontal, sectional, plan view of the central portion of the machine showing the main driving gear arrangement. Fig. 6 is an enlarged detail elevation illustrating the mechanism for cutting window openings in the web. Fig. 7 is a vertical sectional view of the same. Fig. 8 is an enlarged vertical sectional view of the paste and patch applying devices. Fig. 9 is a plan view of the same. Fig. 10 is an enlarged detail side elevation of the central part of the machine looking from the side opposite to that shown in Fig. 1, representing particularly the printing and blanking out mechanisms. Fig. 11 is a plan view of the same. Fig. 12 is a detail view similar to Fig. 10 showing the blanking out mechanism, the intermittent web feeding mechanism, and the blank severing mechanism. Fig. 13 is a detail front elevation of parts of the mechanism shown in Fig. 12. Fig. 14 is a plan view of the main parts of the mechanism shown in Figs. 12 and 13. Figs. 15 and 16 are detail views of the clutch for the intermittent web feed. Fig. 17 is an enlarged detail vertical, transverse sectional view of the machine taken on the line x—x of Figs. 1 and 2 showing the final envelop forming mechanism. Fig. 18 is a side elevation of the same. Fig. 19 is a plan view of the same. Fig. 20 is a view similar to Fig. 17, showing parts in different position. Fig. 21 is a view similar to Figs. 17 and 20 showing more in detail the envelop delivery mechanism. Fig. 22 is an end elevation of the parts shown in Fig. 21. Figs. 23 to 33 illustrate diagrammatically the successive stages of the web and blank in the formation of envelops by my improved machine.

In describing the construction and operation of my improved machine for continuously manufacturing window envelops, I have taken up the mechanisms in the order in which they act upon the moving web fed from the roll of paper. Any suitable form of framework to properly support the operative parts of the machine may be employed. In the specific embodiment of the machine illustrated in the accompanying drawings, I have shown a main rectangular upright frame 1 mounted upon legs 2, and two auxiliary frames arranged at opposite ends of and connected with the main frame 1 as hereinafter explained.

5 is a continuous roll of paper mounted upon an axle 6 supported in open socketed bracket bearings 7, secured to two of the main frame legs 2. In this manner the roll 5 is supported beneath one end of the main frame 1. The continuous web 10 leading from the roll 5 is passed up and around a feed roller 11 which is journaled in the depending bracket bearings 12 secured to the main frame 1. Coöperating with the feed roll 11 is a pressure roller 13, whose trunnions are journaled in the elongated bearing slots 14 formed in extensions of the bracket arms 12. Any suitable means (not specifically shown) may be employed for holding the pressure roll 13 in peripheral engagement with the roll 11 so as to effectively bite and feed the web of paper between them.

The shaft of the feed roller 11 projects beyond the bearing bracket 12 at one side of the machine and has secured to it a sprocket wheel 15 around which operates a sprocket chain 16 driven by a sprocket wheel 17 keyed to the projecting end of a transverse shaft 18 suitably journaled in the main side bars of the frame 1. This transverse shaft 18 carries a central gear 19 meshing with a similar gear 20 carried by the main power shaft 21 which extends transversely of the main frame and is journaled in the main bars of said frame. This power shaft 21 carries at one side of the machine a driving pulley 22.

The brackets 25 secured to the rear legs 2 of the main frame, support a transverse rod or bar 26 upon which are mounted upwardly extending guide arms 27 supporting between them a series of parallel tension bars 28. The web 10 passing from the positively driven feed roll 11 is threaded through the tension bars 28; an excess of slack web being provided between feed roll 11 and the tension bars 28 in the form of loose loops as shown at 10ª, for the purpose hereinafter explained.

Secured to the rear end legs 2, just beneath main frame 1, are slotted bearing brackets 30 in which are journaled the roller shafts 31, 32 and 33. The roller shafts 32 and 33 are journaled in vertically adjustable bearing boxes 34 and 35 which are held in desired adjusted position by means of set screws 36 threaded through the cross bars 38 and engaging the lower bearing boxes 34. This is for the purpose of holding the rollers (presently to be referred to) upon shafts 31, 32 and 33 in proper working relation.

The shaft 33 carries feed roller 40 having a central peripheral recess 41 corresponding in extent with a feeding and cutting roller 42 carried by shaft 32. Upon each side of the roller 42 are mounted the feed rollers 43 and 44 which are of the same diameter as the roller 42. The roller 42 carries upon one half of its periphery the male member or knife 45 of the dies which cut the window openings in the web. This knife 45 may be of any desired shape, depending upon the shape required for the window opening. As shown in the drawings the knife 45 is shaped to cut an opening of flattened oval shape. The shaft 31 carries a roller 46 corresponding in size and position to the roller 42. This roller 46 is formed with a female die member 47 arranged to coöperate with the knife member 45 in cutting window openings in the web. A pin 48 projects radially from the periphery of roller 46 within the die member 47, and the shallow radial opening 49 is formed in the periphery of roller 42 in position to receive the pin 48 as the rollers 42 and 46 rotate. The purpose of the pin 48 is to penetrate and engage the strips of paper cut from the web by dies 45, 47 and carry them to a position above the roller 46 where they are led out of the machine. A stripping plate 50 is supported in peripheral engagement with the roller 46 and is formed with a central slot 51 to straddle the pin 48 each time the roller 46 revolves. The end of the plate 50 passes beneath the projecting end of the cut out strip of paper carried forward by the engagement of pin 48 and strips the same from roller 46 and leads it away from the rollers to any suitable receptacle which may be provided for the same.

The shafts 31, 32 and 33 are geared together by means of gears 52, 53 and 54 so as to cause the coöperating rollers upon said shafts to rotate in unison. The shaft 31 carries at one end a large gear 55 which meshes with and is driven by a gear 56 carried at one end of the transverse shaft 57 suitably journaled in the main frame 1. The gear 56 is driven by intermeshing gears 58 and 59 carried by transverse shafts 60 and 61 journaled in the main frame 1, the shaft 61 also carrying a central gear 62 meshing with and driven by a gear 63 carried by the transverse crank shaft 64 journaled in the main frame 1, and in turn driven by the gear 19 on shaft 18 above referred to.

By the means described, the feeding and cutting rollers 40, 43, 44, 42 and 46 are driven. The continuous web 10 passes from the tension bars 28 over the feed roll 40, around feed rolls 43, 44 and between the cutting and feeding rolls 42 and 46, which cut from the web a succession of spaced window openings indicated at 10$^b$.

70 is an open upright drier frame constituting one of the auxiliary frames of the machine above referred to. This upright frame 70 is rigidly secured to one end of the main frame at top and bottom by means of connecting bars 71, 72. The continuous web 10 passes from the window cutting mechanism just described, to an idler roller 75 freely journaled in the bracket bearings in the lower part of frame 70, and from the roller 75 the web passes across the frame 70 to the pasting and patch applying mechanism which will now be explained.

80 is a guide roller freely journaled in bracket plates 81 secured to the upright frame 70.

82 is a paste fountain in which operates a paste fountain roll 83 suitably journaled in bracket plates 81. The paste fountain 82 is supported upon a transverse bar 84 which is adjustably mounted upon the bracket arms 81 by means of set screws 84$^a$. The fixed part of the cover plate of the paste fountain, by which it is attached to bar 84, is cut out to receive the fountain roller 83 and may serve as a scraper for said roll.

85 is a paste applying roll journaled in the adjustable bracket arms 86 and operating in peripheral engagement with the fountain roll 83. The arms 86 are pivoted upon the opposite projecting ends of shaft of fountain roll 83, and held in desired position by adjusting screws 86$^a$. This roll 85 has a recess 87 cut into its periphery of the proper size and shape to correspond with the size and shape of the window openings 10$^b$ cut into the traveling web 10. This recess 87 is surrounded by a paste applying surface 88 designed to apply a band of paste 10$^c$ around each window opening 10$^b$ of the traveling web, the surface of the roller 85 being cut away around the surface 88 so as to avoid contact with the fountain roller 83 and avoid applying paste over the main surface of the traveling web. The paste applying roller 85 is also formed with a raised portion 89 at one end, in the same peripheral plane as surface 88, designed to take the paste from the roll 83 and apply it to the edge of the traveling paper web 10. This paste applying portion 89 of roller 85 may be a continuous ring to apply a continuous strip of paste to the edge of the moving web of paper, or it may be shaped to correspond with the finished sealing flap of the envelop, in which case the paste applied to the traveling web will not be continuous but will be intermittent. The strip of paste at the edge of the web which is subsequently cut into the sealing flaps 10$^g$ of the envelops, is indicated at 10$^d$ (Figs. 9, 25, 26 and 27). As the web 10 passes around the roller 80 it is engaged by the paste applying roll 85 for applying the patch securing paste around the window openings and the paste for the sealing flap of the envelops. The paste rollers 83 and 85 are mounted upon shafts having their projecting ends geared together by gears 83$^a$ and 85$^a$. The shaft of roller 83 at its opposite end carries a sprocket wheel 83$^b$, see Fig. 1.

90 is a spool containing a continuous roll of transparent patch material of the kind that is commonly employed for covering the window openings of envelops of the type at present under consideration. This spool 90 is mounted upon an axle 91 journaled in the bracket arms 92 extending rearwardly from the drier frame 70. The continuous web 93 of patch material is passed from the spool 90 into the bight of a pair of feeding and cutting rollers 95, 96 which are mounted upon shafts 97, 98 journaled in bracket arms 99, and geared together by gears 100 and 101. The roller 95 carries a serrated knife blade 102 set longitudinally of the shaft 97, and the roller 96 is formed with a longitudinal groove 103 to receive the blade 102 in the rotation of rollers 95, 96 to sever from the web 93 a length or section of patch material suitable for applying over a window opening in the web 10. The cutting and feeding roller 95 is formed with a peripheral groove 104 into which project the guide fingers 105 carried by the transverse rod 105$^a$ mounted in bracket plates 99. The knife blade 102 is transversely slotted to enable it to pass freely by the fingers 105. These fingers 105 deflect the leading edge of the web 93 from the roller 95 into the two inwardly presented grooved guides 106 extending downwardly toward the roller 80 above referred to. Stripper fingers 107 are also provided for preventing the web 93 from following the roller 96.

110 is a pressure roller mounted upon a shaft 111 journaled in the brackets 99. This pressure roller 110 is shorter in length than the roller 80 with which it coöperates, it being designed to take the section of patched material fed upon the moving web 10 and press it firmly upon the pasted surface surrounding the window opening. The roller 110 is made short so as to avoid coming in contact with the pasted surface 10$^d$ of the moving web. The feeding and cutting rollers 95 and 96 are arranged a proper distance away from the rollers 80 and 110 to supply the desired length of patch material into the bight of the rollers 80 and 110 at the moment a section of the material is partially cut off from the web 93, the web 10 passing between rollers 80 and 110 being operated at a slightly greater speed than rollers 95 and 96 to complete the separation of the patch from the web of patch material, and space the successive patches upon the web to accord with the spacing of the window openings. Rollers 80 and 110 are driven by the web 10.

The shaft 98 carries at one end a sprocket wheel 115 and a long sprocket chain 116 passes around the sprocket wheels 115 and 83$^b$ from a driving sprocket wheel 117 carried by the shaft 31 above referred to. By this means the pasting rolls 83 and 85 and the feeding and cutting rolls 95 and 96 are driven at proper speed to correspond with the continuously moving paper web 10. The rollers 95 and 96 continuously feed the web of patch material so that a section of patch material will be in readiness to be applied to a pasted surface around a window opening as each window opening arrives in position upon the roller 80.

The web 10 with patches over the window openings and paste applied to one edge for the subsequently formed sealing flaps, passes across the drying frame 70 to a pair of positively driven feed rollers 120 and 121 which are geared together at 122 and driven by a gear 123 meshing with the gear 54 upon roller shaft 33 above referred to.

The drier frame carries in suitable bearing brackets a plurality of freely journaled rollers 125 around which the web 10 with patches and sealing paste is passed back and forth, from side to side, of the drying frame. It will be observed by reference to Fig. 4 of the drawings that the roller 121 and the drying rollers 125 upon the inner side of the frame 70 are made shorter than the rollers at the outer side of frame 70 for the reason that the pasted surface at one edge of the web 10 is presented inwardly when the web passes over the rollers at the inner side of the frame. The patch and the paste for sealing flaps are dried as the web passes around the rollers 125 to the top of the drying frame 70.

At the inner end of the frame 70 at the top I provide a pair of feeding rollers 130 and 131 which are journaled in suitable brackets attached to the frame 70. The roller 130 is mounted in movable bearings to hold it in operative relation with the roller 131. The shaft of roller 131 is provided with a sprocket wheel 132 around which operates a sprocket chain 133 extending from a driving sprocket 134 keyed to a transverse shaft 135 journaled in suitable brackets secured to the main frame 1. This shaft 135 is mounted directly above and parallel with shaft 57 above referred to, a gear wheel 136 being secured to the end of shaft 135 and meshing with a smaller gear 137 secured to the adjacent end of the shaft 57. By these means the feed rollers 130 and 131 are positively driven at the same speed as the web feeding rollers hereinbefore referred to.

The web 10 passes between the feed rollers 130 and 131 and down under a slack take up bar 140 which is mounted to slide vertically upon the guide rods 141 secured in bracket arms 142. From the bar 140 the web 10 passes up over an idler roller 145 and thence extends through the main frame 1 past the printing and blanking out mechanisms to a pair of intermittently driven feed rolls 150 and 151 which are operated in the manner hereinafter explained. Since the feed of the paper web from the roll 5 up to the positively driven feed rollers 130 and 131 is continuous and the feed of the web from this point past the printing and blanking out mechanisms is intermittent, under the action of the feed rollers 150 and 151, it will be understood that while the intermittent feed is at rest, a surplus of the web 10 is moved past the feed rollers 130 and 131. This slack or surplus of the web is taken up automatically by the lowering of bar 140 in its guides, and when the intermittent feed rollers 150 and 151 feed the web forward, said slack take-up bar 140 will move vertically to permit the forward motion of a sufficient length of web 10 under the action of feed rollers 150 and 151.

160 is the impression bed of the printing mechanism. This bed 160 is mounted in the main frame 1 above the path of the web 10. Beneath the bed 160 is mounted a printing form, which may be of any suitable construction since the printing mechanism specifically forms no part of the present invention. This printing form is indicated at 165 supported in any suitable manner upon the vertically reciprocating frame 166 presently to be explained. The form 165 is adapted to be inked by two or more inking rollers 167, mounted in arms 168 carried by a pair of endless sprocket chains 169 running over sprocket wheels 170 upon shafts 171 and 172. The shafts 171 and 172 are journaled in the reciprocating bed or frame 166 above referred to. The shaft 172 projects beyond the frame 166 and carries upon its outer end a sprocket wheel 175 on which operates an endless sprocket chain 176 extending around tension sprocket wheels 177 and 178 journaled upon an adjustable arm 179 and from said wheels 177 and 178 to a driving sprocket wheel 180 keyed to shaft 57 above referred to. The arm 179 has a tension rod 181 projecting from it through a bracket 182 of the main frame 1 and an adjustable tension spring 183 confined upon said rod 181. This tension device holds the tension sprocket wheels 177 and 178 yieldingly in operative relation to the sprocket wheels 175 and 180 so as to permit the reciprocation of the frame or bed 166. The inking rollers 167 are carried by their chains 169 over an ink distributing roll 185 working in an ink fountain 186 and an ink distributing plate 187 supported upon the frame 166 adjacent to the roller 185. In this manner the ink rolls take the ink and apply it to the form 165 in the usual manner. The vertically reciprocating frame 166 carrying the printing form 165 is provided at each side midway between its ends with the downwardly presented guide pins 190 which are pivotally connected to the frame at 191 and extend through guide lugs 192 presented inwardly from the bracket arms 12 above referred to. The springs 193 surround the pins 190 and are confined thereon between the guides 192 and collars 194 upon the pins. These springs 193 tend to raise the frame 166 in the main frame 1, and serve to counterbalance the weight of the frame.

Beneath the vertically reciprocating bed frame 166 is mounted the crank shaft 64 above referred to, and a similar crank shaft 195 carrying a gear 196 which meshes with and is driven by the gear 20 of the main shaft 21. These two crank shafts 64 and 195 are provided at their opposite ends with crank arms 197 which are connected through the links 198 with four points of the vertically reciprocating frame 166, so that the uniform rotation of the crank shafts will cause the frame 166 to be moved vertically in its guides upon the main frame 1. Each upward movement of the printing form 165 carried by the frame 166 makes an impression upon the section of the web 10 stretched over the impression bed 160. 200 is the grooved member or bed of the blanking out die which is mounted upon the main frame 1.

201 is the movable knife member of the blanking out die mounted upon the vertically reciprocating frame 166. These die members 200 and 201 are arranged in the usual manner to cut from the web of paper an envelop blank of the desired design. Each blank in addition to being outlined by the dies has the folding lines between the flaps and the main body of the blank creased or outlined by creasing dies carried by the die members 200 and 201. The blanks are cut from the web with the exception of the end flaps which are left intact for feeding purposes and subsequently severed for separating the blanks.

Between the impression bed 160 and blanking out die member 200, I provide an idler roll 205 journaled in the free ends of supporting arms 206 which are adjustably mounted upon frame 1 at 207. This idler roller 205 has the continuous web 10 passed over it at a point between the printing and blanking out mechanisms, and tends to hold the web tightly across the faces of the upper members 160 and 200 of said mechanisms. To prevent there being any slight discrepancy in the relation of the patched windows to the printing or blanking out mechanisms, the web can be caused to shift slightly with relation to said mechanisms by adjusting the arms 206 to raise or lower the roller 205, thereby stretching the web more or less between the printing and blanking out mechanisms.

At the moment of printing and blanking out envelops upon the continuous web 10, the web must be held in stationary position upon the members 160 and 200. This is accomplished by providing intermittent operating mechanisms for the web feeding rolls 150 and 151 above referred to. These rolls 150 and 151 are mounted upon shafts 210 and 211 suitably journaled in the main frame 1. The shaft 210 carries a gear wheel 212 which meshes with and is driven by a gear 213 mounted upon a shaft 214 journaled in the frame 1 above the shaft 210. This shaft 214 is provided at one end with a ratchet clutch and a rack and pinion driving mechanism. 215 is the clutch collar pinned to the end of the shaft and formed with ratchet recesses 215ª as shown particularly in Figs. 15 and 16 of the drawings.

216 is a loose clutch member freely journaled upon the shaft 214 adjacent to the fixed collar 215 and carrying in suitable longitudinal recesses 217 the spring dogs 218 which are designed to engage in the ratchet recesses 215ª when the clutch member 216 moves in one direction and to slide out of such engagement when the member 216 moves in the opposite direction. The clutch member 216 has secured to or formed integral with it a gear 219 which meshes with and is driven by a reciprocating rack bar 220 working in a suitable guide 221, said rack bar being connected at its lower end 222 with a bell crank lever 223 journaled to the machine frame at 224 and connected by link 225 with one of the crank arms 197. By these means the web 10 is given an intermittent forward motion past the printing and blanking out mechanisms, the printing and blanking out being accomplished while the web is at rest.

Adjacent to the intermittently operating feed rollers 150 and 151 I provide a shear mechanism for cutting the successive blanks from the web. This mechanism comprises the stationary knife bar 230 supported by bracket 231 beneath the plane of feed of the blanked out web, and a movable shear blade 232 adjustably carried by the rock shaft 233 journaled in the bracket 231 and having a rock arm 234 connected with a link 235 which is pivoted at its lower end 236 to a rocking lever 237 journaled at 224 and carrying at its opposite end an anti-friction roller 238 which operates in the grooved cam 239 keyed to the shaft 195 above referred to. The operation of the shear mechanism with respect to the intermittent feed mechanism is such that immediately following the feeding impulse of the feeding mechanism, the shears are actuated to cut off a blank from the web. Each blank is cut off while it is supported upon the feeding in table of the final envelop forming mechanism which will now be described.

I will have it understood that the essential novelty of my improved machine lies in the combination of mechanisms hereinbefore described for continuously manufacturing window envelop blanks from a continuous web of paper. The envelop forming mechanism which I am about to describe should be understood as the preferred form of mechanism for accomplishing the final step in the continuous manufacture of window envelops. The structure of this envelop forming mechanism must, however, be considered merely as illustrating the preferred form of such mechanism since it will be clear that I do not intend to limit myself to the particular form of such mechanism since the successive window envelop blanks produced as above described, can readily be formed into envelops by various forms of envelop machines, whether acting upon separated blanks as in the illustration in the accompanying drawings or upon a continuous web of blanks, without first separating the blanks by the shearing mechanism above described, as is done in some forms of envelop machines.

Referring to the envelop forming mechanism shown in the drawings, it will be observed first with reference to Figs. 1, 3, 5, 18 and 20 that a shaft 250 extends longitudinally of the main frame 1 and is journaled in suitable bearings in said frame and projected to the left of Fig. 1 where it has bearings in an auxiliary frame 245 constituting the support for the envelop forming machine proper. This driving shaft 250 of the forming machine is driven by miter gearing 251, 252 with the transverse shaft 135 above referred to. At the outer end of the shaft 250 I provide a gear 255 meshing with a similar gear 256 upon a cam shaft 257 journaled in the auxiliary frame 245 and carrying suitable cams hereinafter referred to, for operating certain parts of the envelop forming mechanism. This gear 256 meshes with and drives a large gear 258 secured to the shaft 259 suitably journaled in the auxiliary frame 245 and carrying the gripper cylinder of the forming mechanism as presently explained. This large gear 258 meshes with and drives a smaller gear 260 keyed to the end of an auxiliary cam shaft 261 journaled in the frame 245 and carrying certain operative cams hereinafter described.

As stated above the intermittently operated feed rollers 150 and 151 forward the paper web sufficiently beyond the shears 230—232 to cause the leading edge of the web (which becomes one side of the completed envelop blank) to engage and register with a guide plate 265 mounted at one side of a blank receiving table or platform 266 supported upon the frame 245 and constituting the feed table of the final envelop forming mechanism. When the envelop blank is severed from the web it rests upon the table 266 between the shears and the gage 265. Immediately after a complete envelop blank is deposited upon the table 266 it is engaged by a forked plate 267 which flattens out the blank upon the table. This forked plate 267 is journaled upon a bar 268 secured in the frame 245 and has a projecting rock arm 269 from which depends a forked pitman 270 guided upon the shaft 261 and carrying an anti-friction roller 271 operating upon the periphery of a cam 272 carried by shaft 261.

Mounted upon the shaft 259 is a gripper cylinder 275 which carries two end grippers 276 mounted upon oscillating gripper shafts 277 journaled in the gripper cylinder 275 and provided with gears 278 meshing with oscillating segments 279 pivoted at 280 each carrying an anti-friction roller 281 operating upon a stationary controlling cam 282 suitably secured to frame 245. These two grippers 276 are constructed and operated the same as the grippers upon the cylinder set forth in my Patent No. 1,000,057 dated August 8th, 1911 for improvements in envelop-machine. Each gripper 276 is designed to engage the leading edge of a blank and grip it against the cylinder surface 275$^a$.

In addition to the two grippers 276, the cylinder 275 carries two pairs of side grippers 285 actuated by stationary cams 286. The construction and operation of these side grippers 285 is substantially the same as set forth in my above named patent and need not be further described in the present case. Neither of the gripper structures referred to forms any part of the present invention when considered in a specific sense. Projecting from the feed table 266 in line with the side gage 265 and the lower shear member 230 (which practically constitutes a gage member parallel with said gage 265) are the usual curved side fold forming guides 290 which extend partly over the upper periphery of the gripper cylinder 275. 291 is a pressure roller mounted in rock arms 292 journaled upon the frame 245 at 293. This pressure roller 291 operates in peripheral engagement with the gripper cylinder 275.

With an envelop blank, such as shown in the drawings in position upon the table 266, its leading edge or bottom flap 10$^x$ is engaged by one of the grippers 276, as the gripper rotates in the direction of the arrow and the blank is thereby pulled off of the table beneath the plate 267, causing the side flaps 10$^f$ to engage the guides 290 and be folded inwardly upon their creased lines over the side edges of the plate 267. The infolded side flaps are firmly pressed down upon the blank in their infolded position as shown in Fig. 30 by the engagement of the pressure roller 291. With the blank in this position the infolded side flaps are brought into peripheral engagement with the pasting segments 295 which apply lines of paste to the infolded side flaps as shown in Fig. 31 of the drawings. These paste segments 295 are mounted upon a shaft 296 journaled in adjustable bearings 297 of the adjustably mounted bracket arms 298 carried by a shaft 299 journaled in the bracket extensions of the frame 245. This shaft 299 carries a fountain roller 300 operating in a paste fountain 301 supported upon a bar 302 which is adjustably mounted upon the bracket extensions of the frame 245. Secured to the projecting ends of the shafts 296 and 299 are sprocket wheels 305 and 306 respectively, around which operates an endless sprocket chain 307. Shaft 296 is also provided with a gear 308 which meshes with and is driven by the large gear 258 which operates the gripper cylinder, see Fig. 3.

As the pasting segments 295 start to act upon the infolded side flaps of the blank one pair of side grippers 285 take hold of the blank just in rear of the bottom flap seam line and the end grippers 276 release their hold upon the leading edge of the bottom flap. At the moment of the release of the end gripper 276, a pair of stripper fingers 310 engage the leading edge of the blank and move it outwardly from the gripper cylinder. These stripper fingers 310 are of angular formation and are mounted upon a square bar 311 projecting laterally from a rock arm 312 which is freely journaled upon the shaft 250 and carries an anti-friction roller 313 operating in peripheral engagement with the cam 314 secured to the shaft 257. A spring 315 holds the rock arm 312 in operative relation to the cam 314. The stripping fingers 310 successively take the positions shown in Figs. 17 and 20, as the blank with pasted infolded side flaps is carried forward under the control of the side grippers with the result that the end flap 10$^x$ of the blank will be folded over on the bottom fold line and caused to adhere to the folded inturned flaps. The folded over bottom flap is firmly pressed against the pasted side flaps by means of a pressure roller 320 upon shaft 257 which engages the side seams of the envelop as it is carried forward. The side grippers 285 continue hold of the folded blank until they reach a point substantially in a line drawn from the cylinder shaft 259 and a rock shaft 325, at which point the grippers 285 transfer the sheet to a delivery gripper which will now be explained.

Mounted upon the rock shaft 325 is a yoke-shaped frame 330 formed with a forward gripping bar 331 with which coöperates a gripping finger 332 mounted upon a rock shaft 333 journaled in the yoke-shaped frame 330. A spring 334 connects an arm 335 of rock shaft 333 with a stationary point 336 upon frame 330 to give the gripper 332 a normal closing tendency. The gripper shaft 333 has a second rock arm 337 adapted to run upon a stationary controlling track bar 338 secured to the frame 245 and to operate upon and around a cam finger 339 pivotally mounted in frame 245 at 340 and yieldingly held in engagement with stationary track bar 338 by a spring 341. As will presently appear the arm 337 is adapted to travel upwardly from track bar 338 into engagement with cam finger 339 which opens the gripper by straining its spring 334 and holds it open until the arm 337 slips off the upper end of cam finger 339 and permits spring 334 to close the gripper. At this moment of the closing of gripper 332 the folded blank carried by side grippers 285 upon cylinder 275 is presented between the gripper jaws so that the blank is transferred from the cylinder to the delivery gripper. As the delivery gripper 332 moves downwardly with the blank, the controlling arm 337 again operates on track bar 338 forcing its way beneath the toe of cam 339 which yields to let it pass and finally, by reason of the inclination of track bar 338, is opened to release and deliver the folded blank.

The yoke-shaped frame 330 carrying the delivery gripper is controlled by a rock lever 345 pivoted upon shaft 346 in the frame 245 and carrying an anti-friction roller 347 which runs in peripheral contact with a cam 348 upon shaft 250. This lever 345 is connected through a link 349 with the frame 330. An arm 330$^a$ projects from shaft 325 and is connected by spring 330$^b$ with a stationary rod or bar 245$^a$. The cam 348, opposed by the spring 330$^b$, causes the gripper frame 330 to reciprocate vertically while the controlling devices open and close the gripper to take a sheet from the cylinder 275 and deliver it to a pair of circumferentially grooved pressure and feeding rollers 342 and 343 which are mounted respectively upon the shafts 342$^a$ and 343$^a$ driven by gears 350, 351 and 352, from the gear 256 upon the shaft 257 above referred to.

Freely mounted upon the shaft 343$^a$ is a swinging plate 355 which is connected by a loop 356 with a curved link 357 pivotally connected with one arm of a yoke-shaped rock arm 358 secured to the shaft 346 and having pivotally connected with its other arm a forked pitman 359 straddled and guided upon the shaft 250 and carrying an anti-friction roller 360 which operates upon the cam 361 upon shaft 250. Rock shaft 346 also carries an arm 362 to which a spring 363 is attached causing pitman 359 and connected parts to follow the control of cam 361. This swinging plate 355 rests normally in the position shown in Fig. 17 during which position the folded blank or envelop is transferred to the delivery gripper. The moment the delivery gripper starts downwardly to deliver the envelop to rollers 342 and 343 the plate 355 is swung into vertical position as shown in Fig. 21, to guide the envelop into the bight of said rollers with its sealing flap projecting forward.

Directly beneath the pair of rollers 342 and 343 is a final pair of delivery rollers 365 and 366 mounted upon shafts 367 and 368 driven by gears 369 and 370, the latter of which meshes with the gear 255 above referred to. Channeled guides extend between the rollers 342—343 and 365—366 to form a guide channel for accurately passing the envelop from one pair of rollers to the other.

Resting above the rollers 365, 366 is a horizontally reciprocating plate 375 formed with a hooked end 376 and mounted upon a bar 377 pivotally mounted in the free ends of a yoke-shaped frame 378 which is keyed to and depends from a rock shaft 379 provided with a rock arm 380 from which projects a forked pitman 381 which straddles and guides upon the shaft 261 and carries an anti-friction roller 382 which operates upon cam 383 secured to said shaft 261. The purpose of this sliding hook plate 375 is to rest across the path of the downwardly moving envelop in the position shown in Fig. 20, until the sealing flap 10$^g$ of the envelop engages the plate and curls to one side of the same, the plate 375 moving to the left as the envelop advances downwardly.

Coöperating with the sliding plate 375 is a hook shaped tucker plate 385 mounted upon rock shaft 386, provided with a rock arm 389 connected with a forked pitman 390 which straddles and guides upon the shaft 250 and carries an anti-friction roller 391 operating in peripheral contact with cam 392 upon the shaft 250. As the sealing flap 10$^g$ of the envelop is pulled to one side, the tucker plate 385 moves downwardly and engages the flap upon its creasing line and presses the same into the bight of the final delivery rollers 365, 366, which firmly press the sealing flap against the completed envelop and drop the envelop into a packing box or other suitable receptacle provided to receive it. In the particular form of envelop finishing mechanism shown, the gripper cylinder is designed to take and form two envelops for each revolution, there being two end grippers and two pairs of side grippers.

The operation of the improved machine will be clear from the above description. The important characteristic of the machine is the continuous manufacture of window envelops from a web of paper, a result which has hitherto not been accomplished in the art. The machine described accomplishes this important result in a compartively simple and effective manner. The detail construction of the several mechanisms combined for producing the result is not essential to the scope of my invention since such mechanisms can be variously changed in detail to suit varying requirements without materially modifying the general purpose of the machine. The provision of the loops 10$^a$ of the slack web 10 between the first set of feed rolls and the tension bars is for the purpose of avoiding irregularities in the feed of the web because of unevenness in the supply roll 5.

The improved machine is adapted for making envelops of all styles and sizes. The sizes of the several positively driven feed rollers can be changed to suit the size and styles of envelops to be made so as to effect the proper coöperation of the several parts of the machine. The dies for cutting the window openings may be varied in size and shape and the blanking out dies can of course be changed to suit the required size and style of envelop to be produced.

A very important feature of the present invention is the simple mechanism for continuously applying transparent patches over the window openings. The means for continuously feeding the web of patch material and for cutting window lengths from the web in proper sequence to supply them to the spaced window openings, is considered of great importance because of its simplicity and effectiveness. The speed of the patch feeding devices can be accurately regulated with reference to the speed of the constantly moving web so that the patches will be accurately spaced and applied to the web over the successive window openings which are cut into it.

The paste applied to one edge of the moving web which is afterward formed into sealing flaps for the envelops is preferably applied in a succession of separated patches, particularly when the paper web is thin, since the separated patches of paste are not so apt to curl the edge of the web.

What I claim is:

1. In a machine of the character described, the combination of means for continuously moving the envelop material having window openings therein, means for applying patches to the continuously moving envelop material, and means for timing the operation of said patch applying means to effect longitudinal registration of the patches over the window openings and spacing apart of the successively applied patches.

2. In a machine of the character described, the combination of continuously operating means for feeding a web of paper, continuously operating means for cutting a succession of spaced window openings in said moving web, means for pasting the surface of the moving web around said window openings, and continuously operating means for applying patch material upon the pasted surfaces of said moving web over said window openings.

3. In a machine of the character described, the combination of means for feeding a web of paper, with a window cutting device constructed to operate upon said web while it is moving to cut a succession of spaced window openings therein, means for pasting the surface of the moving web around said window openings, and means for applying spaced sections of patch material to the pasted surfaces of said web over said window openings.

4. In apparatus of the character described, the combination with means for feeding the perforated envelop material; of rotary patch applying means for rolling patches into engagement with the moving perforated envelop material, and means for coördinating the operation of said feeding and applying means to effect longitudinal registration of the patches over the perforations and spacing apart of the successive patches.

5. In a machine of the character described, the combination with mechanism for feeding a continuous web of paper, means for forming spaced window openings in said continuous web of paper, and means for applying patches to the continuous web of paper; of means for coördinating the operations of said feeding means and patch applying means to effect a longitudinal registration of the patches over the previously formed window openings and spacing apart of the successively applied patches.

6. In a machine of the character described, the combination of means for feeding a continuous web of paper, window cutting means operating upon said moving web, pasting means for applying paste to said moving web around said window openings, and patch applying means for supplying a succession of spaced patches to the pasted surfaces of said moving web.

7. In a machine of the character described, the combination of means for feeding a continuous web of paper, window cutting means operating upon said moving web, pasting means for applying paste to said moving web around said window openings, patch applying means for supplying a succession of separated patches to the pasted surfaces of said moving web and means for drying the pasted patches upon said web.

8. In a machine of the character described, the combination with mechanism for feeding a continuous web of paper, means for forming spaced window openings in said continuous web of paper, and means for applying patches to the continuous web of paper; of means for coördinating the operations of said feeding means and patch applying means to effect a longitudinal registration of the patches over the previously formed window openings and spacing apart of the successively applied patches, and means for forming window envelop blanks from the web thus prepared.

9. In a machine of the character described, the combination with means for feeding a continuous web of paper having previously formed window openings therein, and means for applying patches to the continuous web; of means for coördinating the operations of the web feeding and patch applying mechanisms to effect longitudinal registration and spacing of the patches over the previously formed window openings in the web.

10. In an envelop machine, the combination of means for cutting a succession of spaced window openings in a web of paper, means for applying transparent patches to said web over said window openings, and means for cutting out blanks upon said patched web, with means for continuously feeding said web of paper through said window cutting and patch applying devices, and means for intermittently feeding the web of paper to said blanking out means.

11. In an envelop machine, the combination of means for cutting a succession of spaced window openings in a web of paper, means for applying transparent patches to said web over said window openings, and means for cutting out blanks upon said patched web, with means for continuously feeding said web of paper through said window cutting and patch applying devices, means for intermittently feeding the web of paper to said blanking out means, and means for taking up the slack or surplus of the paper web between the patch applying and blanking out devices.

12. In an envelop machine, the combination of means for cutting a succession of spaced window openings in a web of paper, means for applying transparent patches to said web over said window openings, means for printing upon successive sections of said web, and means for cutting out blanks upon said patched and printed web, with means for continuously feeding said web of paper through said window cutting and patch applying devices, and means for intermittently feeding the web of paper to said printing and blanking out means.

13. In an envelop machine, the combination of means for cutting a succession of spaced window openings in a web of paper, means for applying transparent patches to said web over said window openings, means for cutting out blanks upon said patched web, and means for severing the successive blanks from the web, with means for continuously feeding said web of paper through said window cutting and patch applying devices, and means for intermittently feeding the web of paper to said blanking out and blank severing means.

14. In an envelop machine, the combination of continuously operating means for cutting a succession of spaced window openings in a web of paper, continuously operating means for applying transparent patches to said web over said window openings, and intermittently operating means for cutting out blanks upon said patched web, with means for continuously feeding said web of paper through said window cutting and patch applying devices, and means for intermittently feeding the web of paper to said blanking out means.

15. In an envelop machine, the combination of continuously operating means for cutting a succession of spaced window openings in a web of paper, continuously operating means for applying transparent patches to said web over said window openings, intermittently operating means for printing upon successive sections of said web, and intermittently operated means for cutting out blanks upon said patched and printed web, with means for continuously feeding said web of paper through said window cutting and patch applying devices, and means for intermittently feeding the web of paper to said printing and blanking out means.

16. In an envelop machine, the combination of means for continuously feeding a web of paper, and means for cutting window openings in said moving web, with continuously operating means for supplying a succession of patches to said web, said patch supplying means being operated at a slower speed than the web feeding means so as to space the patches upon the web.

17. In an envelop machine, the combination of means for continuously feeding a web of paper, means for cutting a succession of spaced window openings in said web, a guide roller over which said web is passed, a pressure roller coöperating with said guide roller, means for applying paste to the surface of the web around said window openings, and means for successively supplying transparent patches to said pasted surfaces between said guide roller and said pressure roller.

18. In an envelop machine, the combination of means for continuously feeding a web of paper, and means for cutting a succession of spaced window openings in said moving web, with a pair of rollers between which said web is passed and means for successively supplying separated transparent patches to said web between said rollers.

19. In an envelop machine, the combination with means for continuously feeding a web of paper, and means for cutting a succession of spaced window openings in said web, with continuously operating means for feeding an endless tape of patch material, means for cutting lengths from said tape of patch material, and means for guiding said severed lengths of patch material to the moving web of paper.

20. In an envelop machine, the combination of means for continuously feeding a web of paper, means for cutting window openings in said moving web, means for applying paste to said moving web, a pair of patch feeding rolls operating upon a continuous tape of patch material, means for cutting successive lengths of patch material from said tape, suitable guides for leading the successive patches to the moving web of paper, and means for impressing said patches upon the pasted surfaces of the moving web.

21. In an envelop machine, the combination of means for cutting a succession of spaced window openings in a web of paper, means for applying transparent patches to said web over said window openings, and means for cutting out blanks upon said web, with means for continuously feeding said web of paper through said window cutting and patch applying devices, means for intermittently feeding the web to said blank cutting means and a vertically movable slack take-up bar mounted in suitable guides and engaging the web of paper between the continuously operating feeding means and the intermittently operating feeding means.

22. A machine for continuously manufacturing window envelops, comprising means for feeding a web of paper, means for cutting a succession of spaced window openings in said moving web, means for applying transparent patches over said window openings, means for blanking out envelops upon said web, an adjustably mounted web tension device engaging the web and adapted to determine its position with relation to the blanking out means, and means for forming the successive blanks into completed envelops.

23. In an envelop machine, the combination of means for cutting a succession of spaced window openings in a web of paper, means for applying transparent patches to said web over said window openings, means for printing upon successive sections of said web, and means for cutting out blanks upon said patched and printed web, with means for continuously feeding said web of paper through said window cutting and patch applying devices, an adjustably mounted guide roller engaging the web between the printing and blanking out means, and means for intermittently feeding the web of paper to said printing and blanking out means.

24. In an envelop machine, the combination of means for feeding a web of paper, means for cutting window openings in said web, means for applying transparent patches upon said web over said openings, a printing mechanism having fixed and movable members adapted to print upon said web, a blanking out mechanism having fixed and movable members adapted to cut blanks from said web, and a common reciprocating frame upon which the movable members of the printing and blanking out mechanisms are mounted.

25. In apparatus of the character described, the combination with means for feeding a continuous web of paper having previously formed spaced window openings therein, and means for applying patches to the continuous web of paper; of means for causing the operation of said patch applying means to effect a longitudinal registration of the patches over the previously formed window openings and spacing apart of the successively applied patches.

26. An envelop making machine including in combination means for supplying a running envelop web with gummed windows cut therein, means for running a window strip web at slower speed than said envelop web and means for cutting off window lengths from said window strip web and attaching them over the windows in the envelop web.

27. An envelop making machine including in combination means for supplying a running envelop web with gummed windows cut therein, means for running a window strip web at slower speed than said envelop web and rotary means for cutting off window lengths from said window strip web and attaching them over the windows in the envelop web.

28. An envelop making machine including in combination means for supplying a running envelop web with gummed windows cut therein, means for running a window strip web at slower speed than said envelop web and means for cutting off window lengths from said window strip web and speeding up the cut off lengths and attaching them over the windows in the envelop web.

29. An envelop making machine including in combination means for supplying a running envelop web with gummed windows cut therein, means for running a window strip web at slower speed than said envelop web and rotary means for cutting off window lengths from said window strip web and speeding up the cut-off lengths and attaching them over the windows in the envelop web.

30. An envelop making machine including in combination means for supplying a running envelop web with gummed windows cut therein, rotary means for running a window strip web at slower speed than said envelop web and means for cutting off window lengths from said window strip web and speeding up the cut off lengths and attaching them over the windows in the envelop web.

31. An envelop making machine including in combination means for supplying a running envelop web with gummed windows cut therein, rotary means for running a window strip web at slower speed than said envelop web and rotary means for successively cutting off window lengths from said window strip web, and successively speeding up the cut off lengths and attaching them over the windows in the envelop web.

32. An envelop making machine including in combination means for supplying a running envelop web, rotary means for cutting successive windows in said web, means for feeding a window web at a slower speed, and means for cutting off window lengths from said window strip, and speeding up said cut off lengths and attaching them over the window openings in the running envelop web.

33. In an envelop machine, the combination with means for supporting a continuous envelop blank strip, said strip being provided with window apertures therein, of means for adhesively applying a transparent strip of less width than said blank strip, to said blank strip over a window aperture therein, mechanism for blanking and severing said envelop blank strip, folding mechanism for folding a portion of the blank strip not covered by the transparent strip upon the portion adhesively engaged by said transparent strip, and end flap folding mechanism.

34. In an envelop machine, the combination with means for supporting and feeding a continuous envelop blank strip, cutting mechanism for forming window apertures therein, means for adhesively applying a transparent strip of less width than said blank strip to said blank strip over the window aperture therein, blanking mechanism for partially blanking the individual envelops from the said blank strip, said mechanism being constructed to operate upon portions of the blank strip not covered by said transparent strip, and mechanism for folding a portion of the blank strip not covered by the transparent strip upon the portion adhesively engaged by said transparent strip, and end flap folding mechanism.

35. In an envelop machine, the combination with means for supporting and feeding a continuous envelop blank strip, cutting mechanism for cutting window apertures at intervals in said strip, gumming mechanism for applying gum to portions of said strip adjacent to said window apertures, means for feeding and applying a transparent strip of less width than the blank strip to the blank strip over a window aperture therein, mechanism for blanking and severing individual envelop blanks from the blank strip, and means for folding a portion of the blank strip not covered by the transparent strip upon the portion adhesively engaged by the transparent strip, and for folding the end flaps of the envelop.

36. In an envelop mechanism for making envelops from a continuous strip of paper having a series of openings, mechanism for applying transparent patches to cover said openings, comprising means for applying gum around said openings, during the movement of the continuous strip, a pair of pressure rolls between which the continuous strip is passed, and means for passing a transparent patch between said rolls in contact with the gummed surface of the continuous strip simultaneously with the movement of the continuous strip.

37. A mechanism for applying transparent patches to cover openings in perforated envelop material, comprising means for applying gum around the openings of said envelop material, a pair of rollers between which the perforated envelop material is passed, means for severing successive patches from a continuous strip, and means for carrying said severed patches into the bight of said rolls simultaneously with the passage of the envelop material between said rolls.

38. In an apparatus of the character described, the combination with means for feeding the perforated envelop material, of means for applying gum around an opening in said material, rotary means for rolling a patch into engagement with the moving perforated envelop material over the opening therein, means for severing a patch from a continuous strip, and means for carrying said severed patch to said rotary means.

39. In apparatus of the character described, the combination with means for feeding the perforated envelop material, of means for applying gum around the opening in said envelop material, a pair of rolls between which said perforated envelop material is passed, means for severing a patch from a continuous strip, and means for carrying said severed patch into the bight of said rolls simultaneously with the passage of the perforated envelop material.

40. In an apparatus of the character described, the combination with means for moving the envelop material having window openings therein, means for applying gum around the successive openings of said envelop material, a pair of rolls between which the envelop material can pass, means for severing successive patches from a continuous strip and means for carrying said severed patches successively into the bight of said rolls simultaneously with the passage of the envelop material.

41. The following instrumentalities in combination, means for continuously advancing a web, means for cutting a series of windows in predetermined successive positions therein, means for conducting the window blanks away from the web, means for applying gum to one face of said web about the borders of each window, and means for delivering a patch in register against the gummed borders of the windows therein.

42. A mechanism for applying a transparent patch to cover an opening in an envelop blank forming part of a continuous strip, comprising a pair of rolls between which a continuous strip provided with openings is passed, means for applying gum around the openings in said strip, means for severing a patch from a continuous strip, and means for carrying said severed patch into the bight of said rolls simultaneously with the movement of the continuous strip having an opening between said rolls.

43. A mechanism for applying a transparent patch to cover an opening in an envelop blank, comprising means for applying gum around the openings of successive blanks, a pair of rolls between which the blanks are successively passed, means for severing a patch from a continuous strip, and means for carrying said severed patch into the bight of said rolls simultaneously with the passage of a blank between said rolls.

MATTHEW VIERENGEL.

Witnesses:
WM. E. KNIGHT,
M. G. CRAWFORD.